US 6,740,298 B1

United States Patent
Raginskii et al.

(10) Patent No.: US 6,740,298 B1
(45) Date of Patent: May 25, 2004

(54) APPARATUS FOR DISSOLVING NUCLEAR FUEL

(75) Inventors: Leonid Solomonovich Raginskii, Moscow (RU); Vyacheslav Evgen'evich Morkovnikov, Moscow (RU); Nikolai Viktorovich Morozov, Moscow (RU); Sergei Petrovich Eliseev, Moscow (RU); Peter Rance, St. Bees (GB); Timothy Tinsley, Cleator Moor (GB); Iain Denniss, Egremont (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/701,775
(22) PCT Filed: Jun. 3, 1999
(86) PCT No.: PCT/GB99/01537
§ 371 (c)(1),
(2), (4) Date: Jul. 13, 2001
(87) PCT Pub. No.: WO99/63545
PCT Pub. Date: Dec. 9, 1999

(30) Foreign Application Priority Data

Jun. 3, 1998 (RU) .......................................... 99110181

(51) Int. Cl.⁷ .............................................. B01D 11/02
(52) U.S. Cl. ........................ 422/274; 422/159; 422/278; 134/132; 423/20
(58) Field of Search ................................ 422/159, 274, 422/278; 423/2, 4, 20; 198/493, 380, 778; 134/132

(56) References Cited

U.S. PATENT DOCUMENTS

| 3,258,852 A | 7/1966 | White | 34/164 |
|---|---|---|---|
| 4,022,638 A | * 5/1977 | Weet | 134/1 |
| 4,230,675 A | 10/1980 | Yarbro | 422/272 |
| 4,278,531 A | 7/1981 | Hodgson et al. | 209/11 |

FOREIGN PATENT DOCUMENTS

| EP | 0358354 B1 | 3/1990 | B54G/53/30 |

* cited by examiner

*Primary Examiner*—E. Leigh McKane
(74) *Attorney, Agent, or Firm*—Myers Bigel Sibley & Sajovec, P.A.

(57) ABSTRACT

A nuclear fuel dissolution apparatus which comprises a perforated sloping ramp contained within a process chamber for containing solvent for the fuel, a pulsation member which in use creates pulses in solvent in the process chamber, the perforations being designed to direct pulses of solvent along and up the ramp, and a discharge point for fuel hulls disposed at an upper region of the ramp is characterised in that the ramp is made out of flat blades and the perforations of the ramp comprise inclined slits formed between the blades.

21 Claims, 3 Drawing Sheets

APPARATUS FOR DISSOLVING NUCLEAR FUEL

The present invention relates to the reprocessing of irradiated nuclear fuel and particularly the dissolution of nuclear fuel pins.

Nuclear fuel pins consist of pellets of fissile material, e.g. $UO_2$, contained in a cladding which is normally a zirconium alloy sold under the trade Zircaloy. A cluster of pins form a fuel assembly.

Commercial reprocessing of irradiated (spent) nuclear fuel uses the Purex process, which involves chopping up the pins of an assembly prior to dissolution of the fissile material in nitric acid. The pins must be chopped up to expose the pellets to nitric acid because the bulk zirconium alloy is resistant to attack by nitric acid, as is an oxide skin which irradiated zirconium alloy possesses. After the fuel has been dissolved the empty pieces of cladding (hulls) and other residues of the structure of the fuel assembly are encapsulated and disposed of.

Commercial reprocessing plants contain dissolvers based on one of two principles: batch operation or continuous operation using an apparatus with rotating mechanical parts.

In a typical batch dissolver the fuel is sheared into a large basket which is immersed in the dissolver vessel. After the fuel has been leached, the basket is removed from the dissolver using a crane and then tipped to transfer the hulls and other debris to the encapsulation plant. This system requires extensive mechanical handling of the dissolver basket which is heavy and needs a large amount of maintainable equipment in the shielded dissolver cell.

Continuous dissolvers shear the fuel into the segments of a wheel which is rotated inside a large vessel. The existence of rotating parts is a disadvantage and limits the geometry that can be adopted to a very large slab tank if the equipment is ever to be safe.

U.S. Pat. No. 4,246,238 discloses a batch action apparatus comprising a container in which is placed a basket filled with pieces of fuel pins, and to which pipe connections are fitted to feed in and remove solutions and gas. A disadvantage of the apparatus is the complexity of the sealing arrangement when the fuel pin pieces are loaded into the basket and when baskets are discharged from the apparatus, as well as the difficulty of containing radioactivity. In addition, use of such apparatuses would considerably complicate process automation and increase the volumes of radioactive solutions.

U.S. Pat. No. 4,230,675 discloses an apparatus which is used to make countercurrent contact between fuel pin pieces and leaching solution. The apparatus comprises an elongate cylindrical drum which rotates around its longitudinal axis and is divided by transverse partitions into a chamber for feeding in fuel pin pieces and removing solution situated at one end of the drum, and a chamber for exit of the cladding pieces and delivery of solution situated at the other end of the drum. Between these chambers there are several other chambers in which leaching of the fuel from the chopped cladding takes place. In each chamber there are elements which provide for movement of the fuel pin pieces on rotation of the drum. A disadvantage of the apparatus is the complexity of its design, and the presence of moving units and of units subject to intensive abrasive action caused by the fuel pin pieces. An apparatus of this design would therefore have a low level of reliability and require regular servicing and maintenance under conditions of high levels of radioactive contamination.

Moving away now from nuclear reprocessing, USSR author's certificate No. 764698 discloses a mass-exchange device for solid phase treatment (primarily for the treatment of wood chips) which comprises a cylindrical casing inside which is a perforated helical ramp with a helical surface gradient of between 4 and 30 degrees. The perforations are in the form of apertures screened above and below by angled plates. Some of the apertures are fitted with nozzles protruding above the surface of the ramp. In a bottom part of the apparatus, which is separated from the annular container by a grid, there is a pulse generator. In use, solid particles are charged onto the ramp at its bottom end. Pulsed fluid from the pulse generator passes upwards through the apertures in the ramp and raises the solid particles above the ramp, creating a pulsing suspended layer in which the particles are processed by the fluid. The solid particles are moved upwards and discharged at the top of the ramp.

The apparatus of USSR author's certificate No. 764698 could not be used with chopped nuclear fuel pins and is incompatible with a nuclear reprocessing plant. Amongst other things, chopped fuel pins have a diameter of between 8 and 20 mm, a length of between 25 and 100 mm and a weight of up to 70 g and would not be moved up the ramp of the apparatus as described.

A pulsation device which is designed for dissolving nuclear fuel pins is known from EP-A-358354 which comprises a V-shaped duct connected to a pulsation chamber containing nitric acid. Pieces of chopped fuel pin are loaded into the free end of one arm of the V-shaped duct. Compressed air in the pulsation chamber maintains nitric acid in the duct at a level which immerses most of the chopped pieces. The air pressure in the pulsation chamber is periodically released, resulting in most of the nitric acid in the duct leaving it. Compressed air is then again applied to the nitric acid in the pulsation chamber, causing acid to pulse into the duct such that leached hulls in the outlet arm of the duct are pushed upward to a discharge duct through which they leave the V-shaped duct.

An advantage of this apparatus is the simplicity of its design and the absence of moving parts. A disadvantage of the apparatus is the small volume of its process chamber and the low output of a single unit, with pieces of fuel pin spending a long time in the apparatus, as is essential for dissolution of the fuel. This is because the diameter of the V-shaped duct is restricted for criticality reasons, and the depth of the layer of fuel pin pieces in the duct is limited by the requirement that the pieces must move along steadily in a curving duct. To ensure that the required time is spent by the fuel pin pieces in the solution, therefore, a cascade of apparatuses of this type installed one after the other in sequence would have to be used. This would considerably complicate the apparatus layout, reduce the reliability of the equipment and also substantially increase the dimensions of the process areas.

The problem on which a first aspect of the invention is based, therefore, is to provide apparatus for use in the dissolution of nuclear fuel pins in which the apparatus can reliably be used to dissolve fuel contained in chopped cladding and to discharge hulls from the dissolver as well as require little maintenance and servicing, and which would not require a complicated apparatus layout or an excessive process area in the reprocessing plant.

The present invention provides a nuclear fuel dissolution apparatus comprising a perforated sloping ramp contained within a process chamber for containing solvent for the fuel and a pulsation member which in use creates pulses in solvent in the process chamber, the perforations being designed to direct pulses of solvent along and up the ramp, and a method comprising loading solvent into the process chamber, loading fuel pin pieces onto a lower region of the ramp and creating solvent pulses to transport the fuel pin pieces up the ramp to a discharge point where the cladding hulls are discharged from the ramp.

In preferred apparatus the ramp is spiral; the gradient of the spiral is preferably between 1 and 30 degrees and more usually between 1 and 20 degrees. Preferably, the process chamber is annular in cross section.

The gradient of the spiral in an upper zone of the process chamber may be greater than in a lower zone.

It is most preferred that the ramp is made out of flat blades, in which case the perforations of the ramp comprise inclined slits formed between the blades.

Preferably the angle between the plane of the blades and the horizontal is between 10 and 60 degrees.

In practice, the apparatus must be designed to have a so-called "eversafe geometry", that is, to avoid a critical mass of material collecting which allows a self-sustaining fission reaction. For this reason, the apparatus will in practice be designed to control the total amount of fissile material which can accumulate in any one place and/or the geometry in which such accumulated fissile material is held. It is preferred for criticality reasons for the fissile material (chopped fuel pins) to be in elongate form rather than spherical. In a particular version of the method, each pair of adjacent blades makes a slit having a length (the dimension in the radial direction in the case of a spiral ramp in an annular chamber) of no more than 10 times the diameter of a fuel pin; such a design helps avoid an excessive accumulation of chopped fuel pins in the slit. More preferably, the slit length is between 5 and 10 times the diameter of a fuel pin.

In some embodiments the blades are made in the form of a trapezium and are fastened by the smaller end to a central blade support within the process chamber.

Preferred apparatus involves one or both of the features that the average width of the blades (extent of slit channel) is between 3 and 5 times the distances between them and that the distance between the plates at the outside wall of the container is 0.4 to 0.8 times the fuel pin diameter.

Preferably, the pulsation member comprises a pulsation chamber located coaxially within the process chamber. Normally, a neutron absorber is arranged between the pulsation chamber and an inside wall of the annular container.

In a particular version of the invention, the pulsation chamber, usually made in the shape of a cylindrical container, is located coaxially within the process chamber (which is usually annular) and communicates with a lower part of the process chamber by a an upwardly and outwardly directed duct (usually an annular slit). In preferred classes of the invention, a neutron absorber is situated between the pulsation chamber and an inside wall of the annular container.

The invention in another aspect provides an apparatus for the treatment of solid articles by liquid, comprising a container having an outer side wall of circular cross section, a spiral ramp located in the container, and a pulsator communicating with a lower part of the container, and also pipe connections for feeding in and removing pieces of fuel pin, solution and gas, characterised in that the ramp is made up of flat blades placed one after another along the spiral and forming between one another inclined slit nozzles. Such apparatus is particularly suitable for the chemical treatment of solid phase articles larger or heavier than the wood chips with which is concerned the prior art spiral pulsed fluid apparatus.

Usually, the process chamber of either aspect has an inner side wall as well as the inevitable outer side wall. The ramp in such chambers normally extends between the inner and outer side walls of the process chamber.

The present invention also provides a method of dissolving fuel in chopped nuclear fuel pins in an apparatus comprising a perforated sloping ramp contained within a process chamber for containing solvent for the fuel and a pulsation member which in use creates pulses in solvent in the process chamber, the perforations being designed to direct pulses of solvent along and up the ramp, the method comprising loading solvent into the process chamber, loading fuel pin pieces onto a lower region of the ramp and creating solvent pulses to transport the fuel pin pieces up the ramp to a discharge point where the cladding hulls are discharged from the ramp. The method may be performed in the reprocessing of nuclear fuel, the method further including reprocessing the dissolved fuel to form a fissile material optionally in the form of a fuel pellet, a fuel pin or a fuel assembly.

The present invention is further described below by way of example only with reference to apparatus for dissolving the spent fuel of chopped fuel pins. It will be understood, however, that the invention may be applied to the fluid treatment of solids other than fuel pin pieces. The apparatus is illustrated non-limitatively by the accompanying drawings, in which:

FIG. 1 gives a general view of the apparatus for dissolution showing a cross-section and the appearance of the ramp made up of blades fitted one after the other along the spiral;

Figure 1:
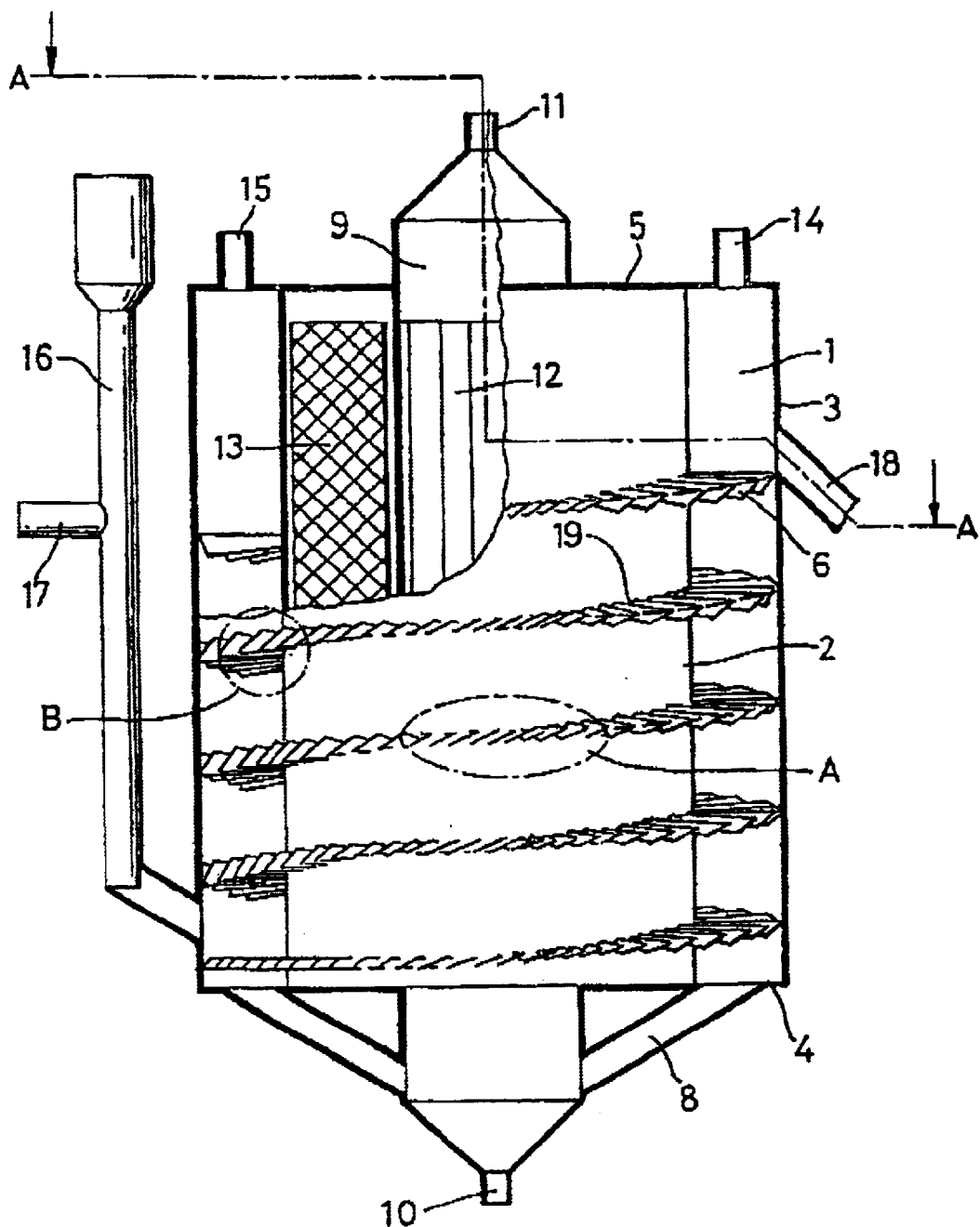
Figure 2:
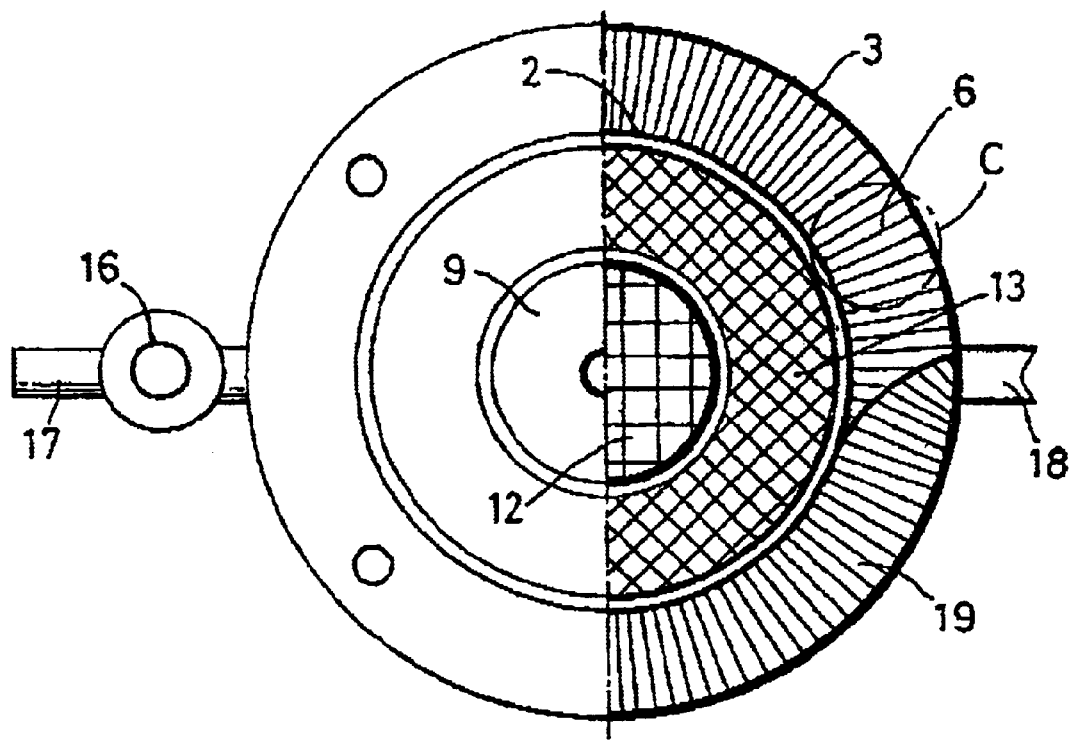
FIG. 2 shows a cross-section of the apparatus along line A—A of FIG. 1.

FIG. 1, therefore, illustrates a nuclear fuel dissolution apparatus which comprises a perforated sloping ramp (19) contained within a process chamber (1) for containing solvent for the fuel, a pulsation member (9) which in use creates pulses in solvent in the process chamber (1), the perforations (7) being designed to direct pulses of solvent along and up the ramp (19), and a discharge point (18) for fuel hulls disposed at an upper region of the ramp.

More particularly, the apparatus shown is for leaching of fuel in fuel pin pieces and comprises an annular reaction container (1), formed by internal (2) and external (3) cylindrical shells, and also a drain (4) and a cover (5). In the annular container (1) are blades (6) fitted one after another along a spiral between the internal (2) and external (3) walls of the container at a distance not exceeding the diameter of the fuel pin. (It will be appreciated that an apparatus of the invention cannot be used to treat articles able to fall between the blades (6)).

Figure 3:
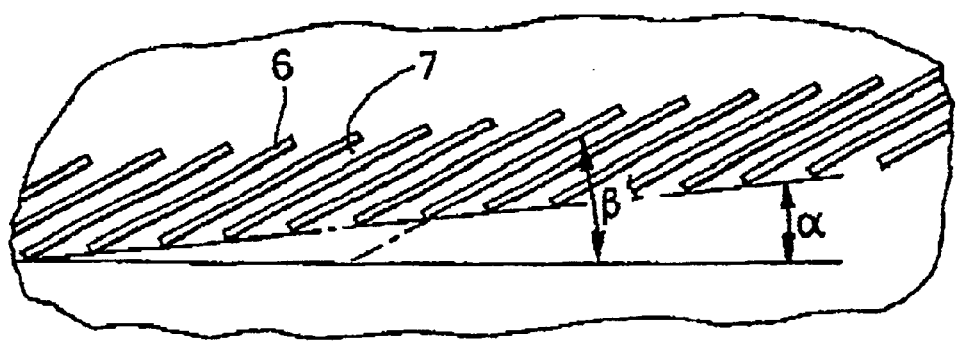
FIG. 3 is an enlarged view of fragment A in FIG. 1 of the internal cylindrical shell of the annular container of the apparatus with ramp blades fitted on it.
Figure 4:
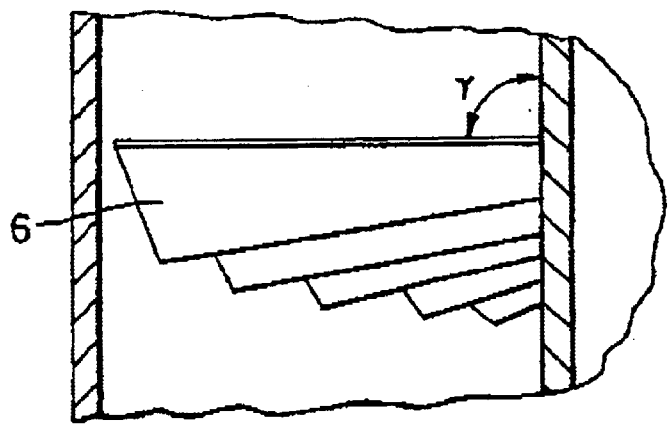
FIG. 4 shows fragment B of the ramp from FIG. 1.
Figure 5:
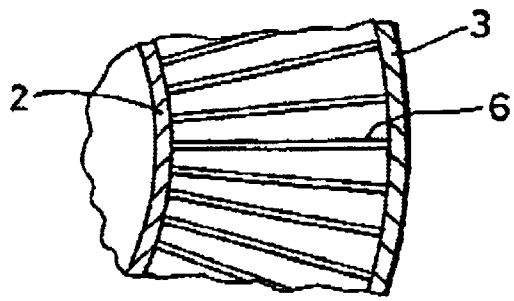
FIG. 5 shows fragment C of the ramp from FIG. 2.

The blades form a spiral ramp for upwards movement of pieces of fuel pin upon pulsation of solvent (nitric acid in the Purex process) in the annular container (1). Each pair of adjacent blades (6) (see FIG. 3) forms an inclined slit nozzle (7). The gradient "α" of the spiral is between 1 and 20 degrees, and the angle "β" between the plane of the blades and the horizontal surface is between 15 and 60 degrees.

The annular container (1) (see FIG. 1) communicates, in this case through an inclined conical slit (8) and the drain (4), with a pulsation chamber (9). In the illustrated embodiment the pulsation chamber is cylindrical and is situated coaxially with the annular container (1); it is equipped in its lower part with an outlet, normally a pipe connection (10), to empty the apparatus. The pulsation chamber (9) communicates, in this case via a pipe connection (11), with a pneumatic pulsator (not shown in FIG. 1), and a plate damping device (12) or other damping device is situated inside the chamber to ensure that liquid in the chamber moves without waves or splashing. In the annular gap between the container (1) and the pulsation chamber (9) is a neutron absorber (13) to ensure nuclear safety while nuclear fuel leaching is going on. The neutron absorber (13) is of course dispensed with in non-nuclear applications.

Suitable fluid inlets and outlets are provided for treatment liquid and for gas. Thus, the illustrated apparatus includes pipe connections to feed in solution (14) and blow off gases (15) connected to the upper part of the annular container (1). An inlet for the solid phase material (in this case pipe connection (16) to feed in pieces of fuel pin with nuclear fuel) is connected to the lower part of the annular container (1). A pipe connection (17) is connected to pipe connection (16) to remove solution from the leaching apparatus; alternatively another solution outlet may be provided. A discharge point is provided for the discharge of fuel hulls from the top of the ramp (19); specifically, a pipe connection (18) is connected to an upper part of the container (1) to remove the tubular fuel hulls after dissolution of the fuel In one embodiment of the pulsation apparatus, the gradient of the spiral in an upper part of the annular container (1) is greater than in a lower part. Thus, for example, the gradient of the spiral in the lower and middle parts of the apparatus may be set at 2 degrees, and in the upper part at 4 degrees. This enables the time spent by the pieces in the apparatus to be extended for fuel pin pieces in which, for one or another reason, there has not been full leaching of the fuel. Since such pieces are of greater mass, an increase in the gradient of the spiral leads to a slowing of their movement towards the zone of discharge from the apparatus.

Figure 6:
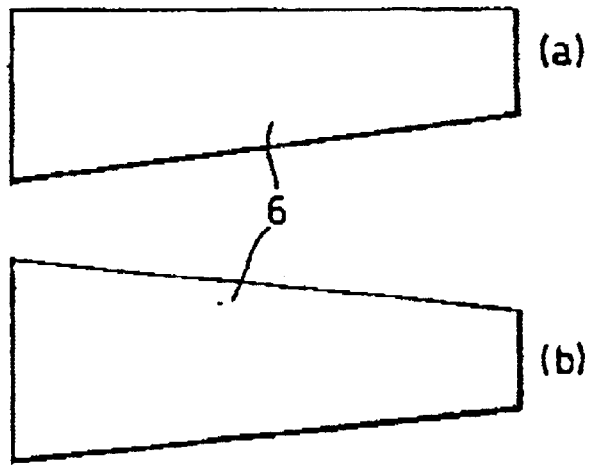
FIG. 6 shows the shape of the blades in the form of a rectangular (a) and isosceles (b) trapezium.

In another embodiment, the blades (6) (see FIG. 6) are made in the form of a trapezium and are fastened by their smaller end on the inside wall (2) of the annular container (1). This enables the optimum angle of the guide surface of the helical ramp towards the axis of symmetry of the apparatus to be obtained to compensate for centrifugal forces on the fuel pin pieces when the pulsation jets act on them to be compensated.

In another version of the invention, the width of the blades (6) is between 3 and 5 times the distances between them. This enables flat jets of the liquid phase to be formed with pulsation of liquid in the annular container, to move the layer of fuel pin pieces upwards along the spiral guide ramp. Irrespective of the blade width, the distance between the blades (6) at the outside wall of the container is suitably 0.4–0.9 times the external diameter of the fuel pin. This ratio of sizes prevents blockage of the slits by fuel pin pieces, and reduces the hydraulic resistance of the apparatus and pulsation energy losses.

The apparatus operates as follows. The annular container (1) and the pulsation chamber (9) are filled with fuel leaching solution, which comes in through the pipe connection (14). The feed of sheared fuel pin pieces, which takes place over a set time, is via the pipe connection (16) onto the lower section of the spiral ramp formed by the blades (6). Pneumatic pulses from the pulsator (not shown in the Figures), which have set parameters for gas pressure, frequency and shape of oscillations along the pipe (11) (see FIG. 1), enter the pulsation chamber (9). Under the influence of these pulses, the solution filling the pulsation chamber (9) and the annular container (1) moves in an oscillating (reciprocal) fashion at a set frequency, amplitude and pulsation shape. The level damper (12) which is in the pulsation chamber (9) ensures that the solution moves without waves or splashing.

These oscillations are transferred via the slit channel (8) to the solution in the annular container (1). Passing through the slit nozzles (7) formed by the blades (6) (see FIG. 3) of the spiral ramp, the solution forms flat pulsation jets. When the solution in the annular container (1) moves upwards under the influence of these jets, the fuel pin pieces are taken away from the surface of the spiral ramp formed by the blades (6) and move along and up it by a certain distance. When the compressed gas is released from the pulsation chamber (9) into the blow-off, the solution in the container (1) moves downwards through the static difference in levels in the annular container (1) and the pulsation chamber (9). This makes the solution press the fuel pin pieces to the blades (6) of the ramp, and they move no further along the ramp until the next pulse. In subsequent pulsation cycles, the process is repeated and the fuel pin pieces gradually move along the spiral ramp in an upward direction. Moving along the spiral ramp, the fuel pin pieces gradually rise upwards through the apparatus and at the end of the ramp they pass out of the apparatus via the pipe connection (18), along with a certain quantity of solution.

Fresh solution entering the annular container (1) via the pipe connection (14), moves towards the fuel pin pieces, dissolving the fuel contained in them, and leaves the apparatus through a pipe connection (17), which is connected to the loading channel (16). To remove gases formed during the process of spent fuel dissolution, a blow-off pipe is provided on the cover (5) of the annular container (1). As the fuel dissolves in the fuel pin pieces, their mass diminishes, and their rate of movement along the ramp rises. To reduce the rate of movement of the fuel pin pieces in which fuel still remains, the design of the apparatus envisages an increase in the gradient of the spiral ramp in the upper part of the apparatus.

The invention in preferred embodiments provides pulsation apparatus having the combination of spatial and geometric characteristics which will give the most effective hydrodynamic conditions for stable movement of pieces of sheared fuel pin up the spiral in the annular space with fuel pieces having a length to diameter ratio of between 1:1 and 6:1 while preventing criticality in the apparatus and giving it a high output.

The method of the invention is typically performed in the reprocessing of nuclear fuel, the method further including reprocessing the dissolved fuel to form a fissile material optionally in the form of a fuel pellet, a fuel pin or a fuel assembly.

In another embodiment of apparatus in accordance with the present invention, the welded together blades of the above described embodiment are replaced by a single plate having transverse elongate slots located therein.

We claim:
1. A nuclear fuel dissolution apparatus which comprises a perforated sloping ramp contained within a process chamber for containing solvent for the fuel, a pulsation member which in use creates pulses in solvent in the process chamber, the perforations being designed to direct pulses of solvent along and up the ramp, and a discharge point for fuel hulls disposed at an upper region of the ramp characterized in that the ramp is made out of flat blades and the perforations of the ramp comprise inclined slits formed between the blades, wherein the ramp is spiral and the gradient of the spiral in an upper zone thereof is greater than in a lower zone.

2. An apparatus of claim 1 in which the process chamber has an outer side wall which is circular in cross section.

3. An apparatus of claim 1 in which the gradient of the spiral is between 1 and 30 degrees.

4. An apparatus of claim 3 in which the gradient is between 1 and 20 degrees.

5. An apparatus of claim 1 in which the angle between the plane of the blades and the horizontal is between 10 and 60 degrees.

6. An apparatus of claim 1 in which the inclined slits are no more than 10 fuel pin diameters in length.

7. An apparatus of claim 1 in which the average width of the blades is between 3 and 5 times the distance between them.

8. An apparatus of claim 1 in which the distance between the blades at the outside wall of the container is 0.4 to 0.8 times the fuel pin diameter.

9. An apparatus of claim 1 in which the pulsation member comprises a pulsation chamber disposed coaxially within the process chamber.

10. A nuclear fuel dissolution apparatus which comprises a perforated sloping ramp contained within a process chamber for containing solvent for the fuel, a pulsation member which in use creates pulses in solvent in the process chamber, the perforations being designed to direct pulses of solvent along and up the ramp, and a discharge point for fuel hulls disposed at an upper region of the ramp characterized in that the ramp is made out of flat blades and the perforations of the ramp comprise inclined slits formed between the blades, wherein the blades are made in the form of a trapezium and are fastened by the smaller end to a central blade support within the process chamber.

11. A nuclear fuel dissolution apparatus which comprises a perforated sloping ramp contained within a process chamber for containing solvent for the fuel, a pulsation member which in use creates pulses in solvent in the process chamber, the perforations being designed to direct pulses of solvent along and up the ramp, and a discharge point for fuel hulls disposed at an upper region of the ramp characterized in that the ramp is made out of flat blades and the perforations of the ramp comprise inclined slits formed between the blades, wherein the pulsation member comprises a pulsation chamber disposed centrally within the process chamber.

12. An apparatus of claim 11 in which a neutron absorber is arranged between the pulsation chamber and an inside wall of the annular container.

13. An apparatus for the treatment of solid articles by liquid, comprising a container having an outer side wall of circular cross section, a spiral ramp located in the container, and a pulsator communicating with a lower part of the container, and also pipe connections for feeding in and removing pieces of fuel pin, solution and gas, characterized in that the ramp is made up of flat blades placed one after another alone the spiral and forming between one another inclined slit nozzles and the perforations of the ramp comprise inclined slits between the blades, wherein the gradient of the spiral in an upper zone thereof is greater than in a lower zone.

14. An apparatus of claim 13 in which the gradient of the spiral is between 1 and 30 degrees.

15. An apparatus of claim 14 in which the gradient is between 1 and 20 degrees.

16. An apparatus of claim 13 in which the angle between the plane of the blades and the horizontal plane is between 15 and 60 degrees.

17. An apparatus of claim 13 in which the average width of the blades is between 3 and 5 times the distances between them.

18. An apparatus for the treatment of solid articles by liquid, comprising a container having an outer side wall of circular cross section, a spiral ramp located in the container, and a pulsator communicating with a lower part of the container, and also pipe connections for feeding in and removing pieces of fuel pin, solution and gas, characterized in that the ramp is made up of flat blades placed one after another alone the spiral and forming between one another inclined slit nozzles and the perforations of the ramp comprise inclined slits between the blades, wherein the blades are made in the form of a trapezium and are fastened by the smaller end to a central blade support within the process chamber.

19. A method comprising dissolving fuel in chopped nuclear fuel pins in a nuclear fuel dissolution apparatus which comprises a perforated sloping ramp contained within a process chamber for containing solvent for the fuel, a pulsation member which in use creates pulses in solvent in the process chamber, the perforations being designed to direct pulses of solvent along and up the ramp, and a discharge point for fuel hulls disposed at an upper region of the ramp characterized in that the ramp is made out of flat blades and the perforations of the ramp comprise inclined slits formed between the blades.

20. A method according to claim 19 comprising loading solvent into the process chamber, loading fuel pin pieces onto a lower region of the ramp and creating solvent pulses to transport the fuel in pin pieces up the ramp to a discharge point when the cladding hulls are discharged from the ramp.

21. A method of claim 19 which is performed in the reprocessing of nuclear fuel, the method further including reprocessing the dissolved fuel to form a fissile material optionally in the form of a fuel pellet, a fuel pin or a fuel assembly.

* * * * *

UNITED STATES PATENT AND TRADEMARK OFFICE
CERTIFICATE OF CORRECTION

PATENT NO.   : 6,740,298 B1
DATED        : May 25, 2004
INVENTOR(S)  : Raginskii et al..

It is certified that error appears in the above-identified patent and that said Letters Patent is hereby corrected as shown below:

Title page,
Item [30], Foreign Application Priority Data, the application number should read
-- 98110181 --

Signed and Sealed this

Twenty-third Day of November, 2004

JON W. DUDAS
*Director of the United States Patent and Trademark Office*